United States Patent [19]

Kasper et al.

[11] Patent Number: 5,055,795
[45] Date of Patent: Oct. 8, 1991

[54] TRAVELING WAVE TYPE TRANSVERSAL EQUALIZER

[75] Inventors: Bryon L. Kasper, Allentown, Pa.; Osamu Mizuhara, Lakewood, N.J.

[73] Assignee: AT&T Bell Laboratories, Murray Hill, N.J.

[21] Appl. No.: 529,834

[22] Filed: May 29, 1990

[51] Int. Cl.$^5$ .............................................. H03F 3/60
[52] U.S. Cl. .................................... 330/54; 330/149; 330/277; 333/18; 333/28 R; 359/161; 359/189
[58] Field of Search ................ 330/54, 277, 149; 333/18, 28 R; 375/11, 14; 455/617, 619

[56] References Cited

U.S. PATENT DOCUMENTS

| | | | |
|---|---|---|---|
| 4,291,286 | 9/1981 | Wagner | 330/277 X |
| 4,486,719 | 12/1984 | Ayasli | 330/286 |
| 4,668,920 | 5/1987 | Jones | 330/286 |
| 4,733,195 | 3/1988 | Tserng et al. | 330/286 |
| 4,845,440 | 7/1989 | Aitchison | 330/277 |
| 4,876,516 | 10/1989 | Dougherty | 330/54 |

OTHER PUBLICATIONS

Lucky, R. W., "Signal Filtering with the Transversal Equalizer", IEEE Proc. 7th Allerton Conf. on Circuit System Theory, 1969, pp. 792-799.

Primary Examiner—James B. Mullins
Attorney, Agent, or Firm—Eli Weiss

[57] ABSTRACT

A transversal equalizer is realized by employing variable gain and delay in the amplification branches of a traveling wave amplifier. Specifically, by adjusting the gain and delay in each branch, the traveling wave type transversal equalizer may be adjusted to having a complementary frequency response in order to compensate for linear channel gain and phase ripples. This approach permits the transversal equalizer to be designed without the use of resistive splitter and combiner networks and, therefore, without the use of high gain amplifiers. Without such amplifiers, splitters and combiners, the smaller physical size, which is afforded thereby, allows the transversal equalizer to be easily assembled as a hybrid integrated circuit.

12 Claims, 7 Drawing Sheets

TRAVELING WAVE TYPE TRANSVERSAL EQUALIZER

TECHNICAL FIELD

This invention relates to the field of lightwave systems for equalization in which the system compensates for the effects of distortion within a transmission channel.

BACKGROUND OF THE INVENTION

Although transversal equalizers have been used for many years in communication networks, only recently have their applicability to ultra-high bit rate optical communication systems been realized as a means to improve receiver sensitivity. See, for example, B. Kasper et al., *J. Lightwave Technology*, Vol. LT-5, pp. 344-47 (1987). In particular, conventional transversal equalizers, which comprise several variable delay taps and amplifiers in parallel, have been utilized to decrease the intersymbol interference caused by the non-ideal transmission characteristics of the associated channel that results from non-uniform gain and delay over the frequency band of the channel.

In general, a conventional transversal equalizer divides an incoming electrical signal into several branches, effectuated by a series of resistive networks. Each branch then delays and amplifies or attenuates the signal therein by a variable amount so as to counteract and correct for distortion within the original signal. For example, a pulse transmitted from a non-ideal channel may have several overshoots and undershoots. An undershoot may be canceled by adding to the original pulse an inverted and delayed replica of itself through the use of resistive combiner networks. Depending on the pulse response of the linear channel, the polarity and delay within each branch may be selected accordingly to cancel any number of undershoots or overshoots. In other words, amplification and delay within each branch may be selected such that the overall impulse response of the channel and the transversal equalizer has substantially an ideal pulse response. For a more detailed discussion of signal filtering with transversal equalizers, see, for example, *IEEE. Proc. 7th Allerton Conference On Circuit System Theory*, pp. 792-9 (1969).

Generally, conventional transversal equalizers require wide band, high gain amplifiers within each branch to compensate for the attenuation resulting from the required lossy components, such as resistive splitter and combiner networks. Although these amplifiers serve to improve the isolation between the outputs and inputs of each branch, their prohibitively large size, cost and non-cascadability make integration problematic. Additionally, the structure is substantially complicated because each amplifier typically requires a high power current supply in order to provide sufficient gain for compensating signal attenuation therein. While prior art transversal equalizers have performed acceptably, the overall performance has been further limited and critically dependent on the non-ideal characteristics of these wide band, high gain amplifiers, such as gain and phase ripples.

SUMMARY OF THE INVENTION

A transversal equalizer overcoming the drawbacks of the prior art is realized by employing variable gain and delay in amplification branches of a traveling wave amplifier. Specifically, by adjusting the gain and delay in each branch, the traveling wave type transversal equalizer may be adjusted to have a complementary frequency response in order to compensate for linear channel gain and phase ripples. This approach permits the transversal equalizer to be designed without the use of resistive splitter and combiner networks and, therefore, without the use of high gain amplifiers. Without such amplifiers, splitters and combiners, the smaller physical size that is afforded thereby allows the transversal equalizer to be easily assembled as a hybrid integrated circuit.

In one exemplary embodiment, a plurality of amplifiers are successively coupled between input and output ports, each comprising an "artificial" transmission line formed by the parasitic capacitances of the amplifiers and inductors positioned between each amplifier. By appropriately choosing the delay and gain in each associated amplification branch, the equalizer can compensate for linear channel distortion, such as echoes, within an electrical signal that is fed into its input port. In accordance with the principles of the invention, delay within each branch may be adjusted by adding between amplification branches, lengths of transmission lines having a characteristic impedance matched to the input-/output impedance of the transversal equalizer.

Various feedback control circuits may be used in adjusting the gain of each amplifier so as to obtain the desired equalizer frequency response. Such feedback control circuits afford adaptive equalization which is desirable for compensating incoming signals having frequency or phase response variations.

BRIEF DESCRIPTION OF THE DRAWING

A more complete understanding of the invention may be obtained by reading the following description in conjunction with the appended drawing in which.

DETAILED DESCRIPTION

A novel transversal equalizer that compensates for distortion within a transmission channel is realized by employing variable delay and gain within branches of a traveling wave amplifier, thus, allowing intersymbol interference to be substantially reduced. Specifically, by adjusting the delay and gain within amplification branches, the equalizer may be adjusted to have a complementary frequency response in order to compensate for the distortion within an electrical signal. Before describing the inventive transversal equalizer, however, it will be instructive to discuss the operating principles of a traveling wave amplifier, more commonly known as a distributed amplifier.

It is often desired to produce signals at a power level higher than can be produced by a single device. This is commonly accomplished by combining in parallel two or more amplifiers in order to increase the output signal level. However, at high frequencies, the loss and distortion associated with a signal propagating along a transmission line is highly dependent on whether network elements connected thereto have been properly matched to both the output impedance of the signal source and the characteristic transmission line impedance. Accordingly, in designing high gain amplifiers, specical attention is generally given in matching impedances of amplifying elements to the output impedance of the signal source as well as to the characteristic impedance of the transmission line. While resistive power splitters and combiners may be utilized for impedance matching between network elements, such as amplifying elements, the signal loss associated therewith has led to the development of alternative techniques which, among other things, are less lossy.

Figure 1:
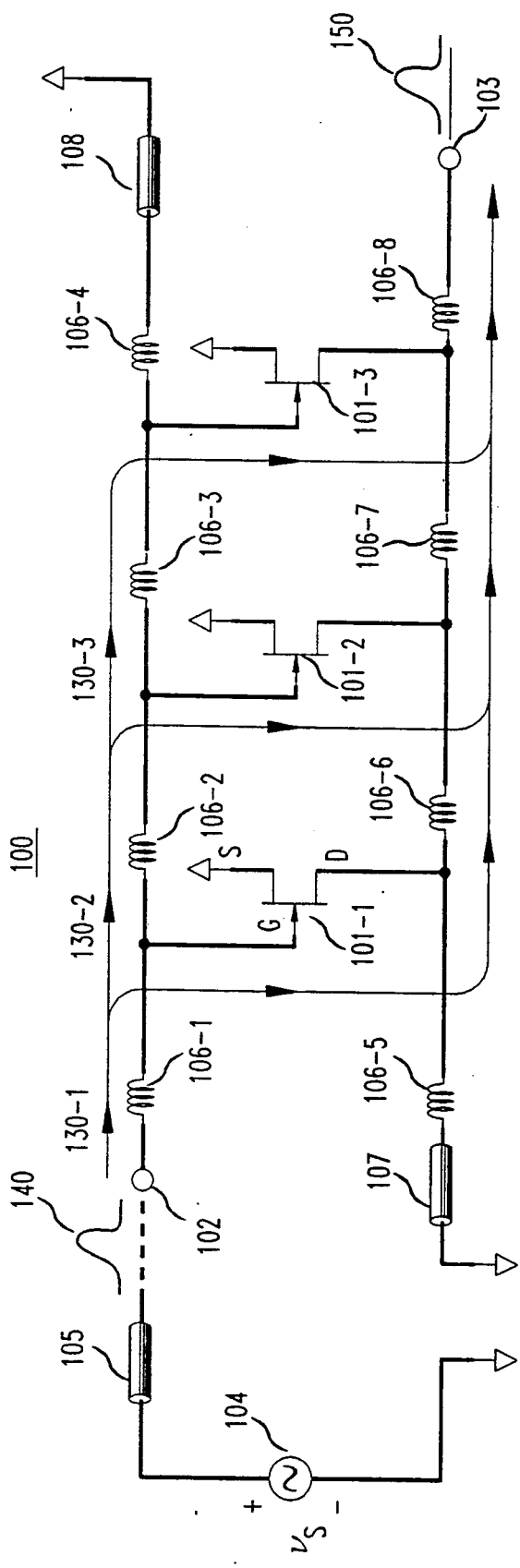
FIG. 1 is a schematic circuit diagram of a traveling wave amplifier.

One particular amplifier circuit that has been widely used for high speed operation without impedance matching individually each amplifier element to the output impedance of the signal source is a distributed amplifier or traveling wave amplifier circuit. As illustrated in FIG. 1, a typical traveling wave amplifier 100 utilizes a series of amplifiers, here field effect transistors (FETs) 101-1, 101-2 and 101-3, coupled in parallel between input and output ports 102 and 103, respectively, to provide amplification of high frequency electrical signal 140 fed to input port 102 from signal source 104, which has an output impedance 105 of $Z_0$. Each of the FETs 101-1, 101-2, and 101-3 includes a gate G, a source S, and a drain D as illustrated by the literal designation adjacent to FET 101-1. Input electrodes, here the gates, of FETs 101-1, 101-2 and 101-3 are electrically interconnected in cascade via inductors 106-1, 106-2, 106-3 and 106-4, as indicated. Similarly, output electrodes, here the drains, of each FET is electrically interconnected to output port 103 via inductors 106-5, 106-6, 106-7 and 106-8. Each amplifier receives a portion of incoming electrical signal 140 and amplifies that particular portion of signal to yield amplified signal 150 appearing at output port 103. It should be noted that the signal delay between input port 102 and output port 103 for each signal path has an equal amount of delay to insure maximum gain. That is, time delays associated with amplification branch 130-1, 130-2 and 130-3, as illustrated in FIG. 1, are substantially equal.

Figure 2:
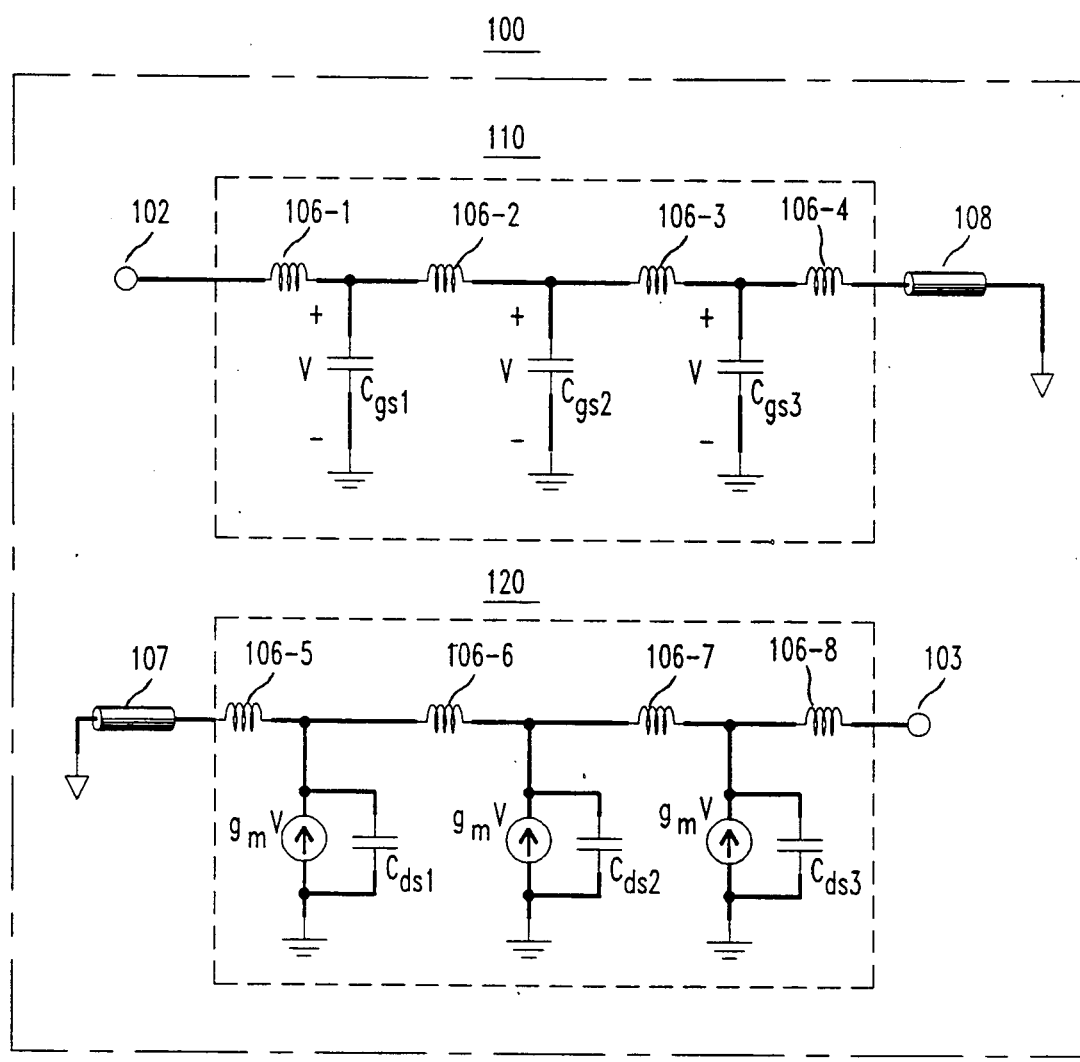
FIG. 2 is an equivalent circuit diagram for the traveling wave amplifier shown in FIG. 1.

Advantageously, and as will become apparent as this description proceeds, traveling wave amplifier 100 utilizes the input and output capacitances of each FET along with the inductance of each inductor in order to establish "artificial" transmission lines, which when properly terminated provide good impedance matching and, moreover, are effectively lossless. Referring to FIG. 2, it is noted that the equivalent circuit of traveling wave amplifier 100 includes the inherent capacitances between the gate and source electrodes of each FET as represented by capacitors $C_{gs1}$ to $C_{gs3}$, respectively. Also, included are the inherent drain-to-source capacitances, $C_{ds1}$ to $C_{ds3}$ of FETs 101-1 to 101-3, respectively. This, of course, assumes that there are no dissipative elements in the FETs and, therefore, any gate or drain resistances may accordingly be neglected. Those skilled in the art will note that each FET includes in the equivalent circuit thereof, a current source which produces a current $g_m V$, where $g_m$ is the transconductance and V is the voltage across the source-gate capacitances $C_{gs}$ of such transistors.

The inductance of inductors 106-1 to 106-4 are chosen in accordance with the gate-to-source capacitances such that an equivalent or "artificial" lossless transmission line 110 is formed which has a characteristic impedance matched to the output impedance $Z_0$ of signal source 104, typically 50 ohms. This may require, however, different inductance values for each inductor. In a similar fashion, the inductance of inductors 106-5 to 106-8 are chosen in accordance with the drain-to-source capacitances such that an equivalent or "artificial" lossless transmission line 120 is formed which has a characteristic impedance matched to the input impedance of any network that receives amplified signal 150 from outport 103. It should be expressly noted that transmission lines 110 and 120 are formed by utilizing the gate-to-source capacitances and drain-to-source capacitances, respectively, and inductors 106-1 through 106-8 in a manner well known in the art. See, Schilling and Belove "Electronic Circuits: Discrete and Integrated", McGraw-Hill Book Co., 1968, Chapter 14, pp. 565-68.

Conventional traveling-wave amplifier theory requires that impedance terminators 107 and 108 be matched to the respective transmission line characteristic impedances to avoid reflected waves. Accordingly, the input and output impedances of traveling wave amplifier 100 are those of properly terminated transmission lines, thereby having the low pass filter characteristics thereof. Here, if equivalent transmission lines 110 and 120 are properly terminated, then, traveling wave amplifier 100 has an input and output impedances approximately equal to the characteristic impedances of transmission lines 110 and 120, respectively. As noted above, inductors 106-1 to 106-4 and the gate-to-source capacitances of the FETs are equivalent to the lumped-parameter approximation of a transmission line having a characteristic impedance $\sim \sqrt{L/C_{gs}}$, where L is the inductance of inductors 106-1 to 106-4. Similarly, inductors 106-5 to 106-8 and the drain-to-source capacitances form transmission line 120 having a characteristic impedance $\sim \sqrt{L/C_{ds}}$, where L is the inductance of inductors 106-5 to 106-8.

Figure 3:
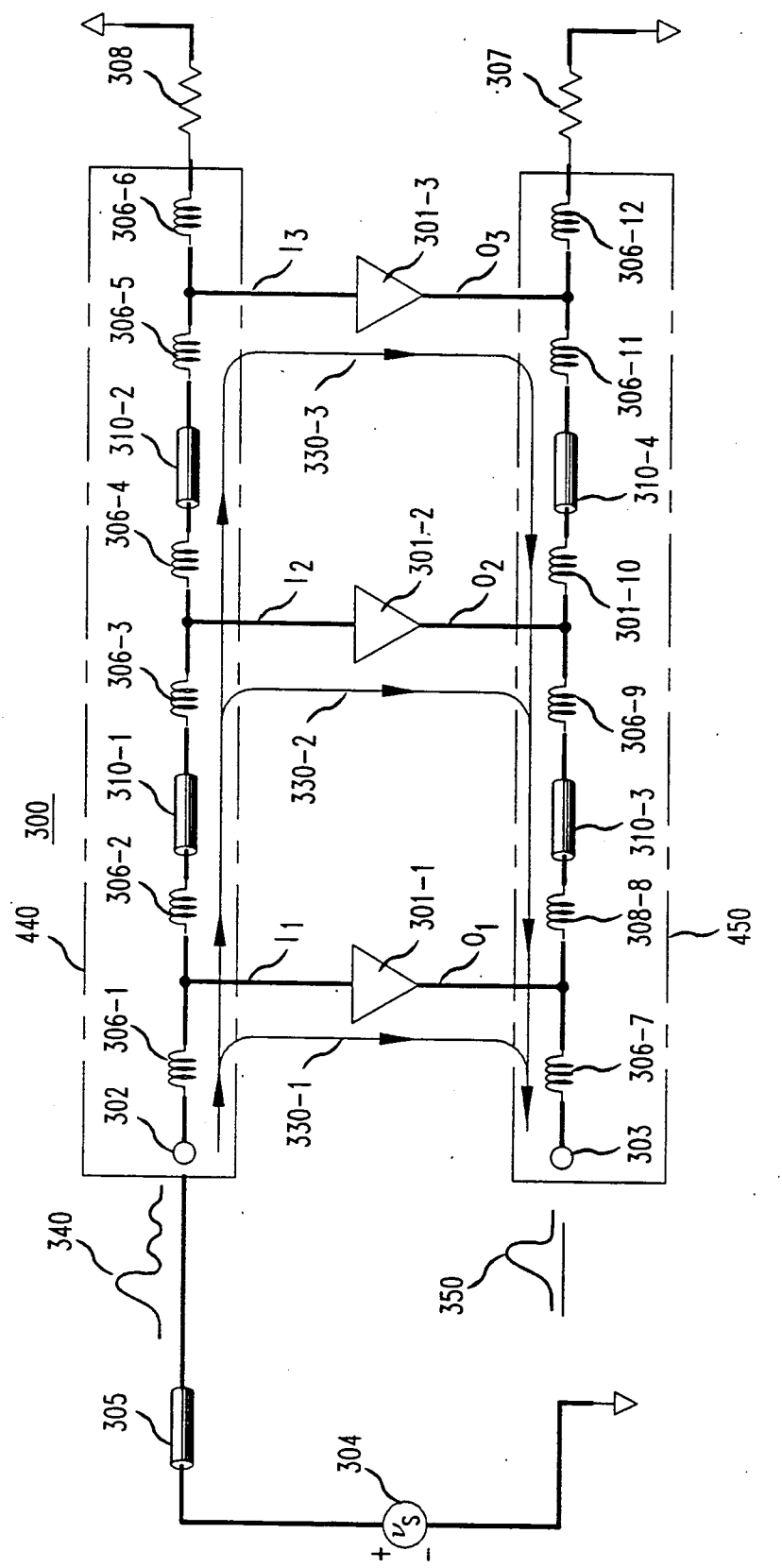
FIGS. 3, 9 and 10 are schematic circuit diagrams of exemplary embodiments of a transversal equalizer in accordance with the principles of the invention.

Illustrated in FIG. 3 is exemplary traveling wave transversal equalizer 300 in accordance with the principles of the invention that utilizes a traveling wave configuration similar to the one discussed in detail above-herein. Traveling wave transversal equalizer 300 is shown to include a plurality of amplifiers 301-1, 301-2 and 301-3 successively coupled between input port 302 and output port 303 to provide equalization of electrical signal 340 fed to input port 302, such equalized electrical signal 350 appearing at output port 303. Here, the exemplary traveling wave transversal equalizer utilizes fix gain amplifiers. It is to be understood, however, that the equalizer depicted in FIG. 3 is for the purpose of illustration only and not for the purpose of limitation. Other amplifiers could be used which have variable gain, either positive or negative. For example, amplifiers 301-1, 301-2 and 301-3 may be in the form of a four-quadrant multiplier utilizing bipolar transistors or field effect transistors, such as metal electrode semiconductor field effect transistors (MESFET), dual gate field effect transistors, and the like.

Amplifiers 301-1 thru 301-3 have input electrodes $I_1$, $I_2$ and $I_3$, respectively, in cascade and electrically interconnected via inductors 306-1 thru 306-6, as indicated. Output electrodes $O_1$, $O_2$ and $O_3$ of amplifiers 306-1, 306-2 and 306-3, respectively, are electrically interconnected via inductors 306-7 thru 306-12, as shown. The input electrode of the first of the amplifier, here $I_1$ of amplifier 306-1, is connected to input port 302 through inductor 306-1 whereas the respective output electrode $O_1$ is connected to output port 303 through inductor 306-7. The last of the amplifiers, here 301-3, has its input electrode $I_3$ connected to termination resistor 308 through inductor 306-6, as shown, and its output electrode $O_3$ similarly connected to termination resistor 307 through inductor 306-12. Similar to other traveling wave type configurations, transversal equalizer 300 utilizes the input and output capacitances of each amplifier along with the inductance of each inductor in order to establish "artificial" transmission lines, here 440 and 450. It should be specifically noted that inductors 306-1 thru 306-6 are chosen in accordance with the input capacitances of amplifiers 301-1 thru 301-3 such that transmission line 440 has a characteristic impedance approximately matched to the input impedance $Z_0$ of signal source 304, that is, impedance element 305. In similar fashion, inductors 306-7 thru 306-12 are chosen in accordance with the output capacitances of amplifiers 301-1 301-3 such that "artificial" transmission line 450 is formed having a characteristic impedance matched to the output impedance of termination resistor 307.

Advantageously, transversal equalizer 300 has its output port 303 switched to the other side as compared to conventional traveling wave configuration 100 thereby allowing each amplification branch to have a different associated time delay. That is, amplification branches 330-1, 330-2, 330-3, as illustrated, each has a different associated time delay between input port 302 and output port 303. It should be expressly noted that in prior art traveling wave amplifiers, the length of transmission lines between amplifier stages could not be changed because of the low pass filter structure thereof. Such a restriction prevented prior art configurations to utilize a length of the transmission line as a delay line. Importantly, in contradistinction to the prior art, traveling wave configuration 300 by having an appropriate delay between each amplification branch acts as a transversal equalizer in a manner similar to conventional transversal equalizers discussed abovehere in. The delay in each branch may be appropriately adjusted by adding within each amplifier branch, either in the input or output transmission line or both, transmission lines 310-1 thru 310-4. In particular, transmission lines 310-1 and 310-2 each has a characterized impedance matched to the input impedance of traveling wave amplifier 300, that is, termination resistor 308 and impedance element 305. Moreover, transmission lines 310-1 and 310-2 are inserted between inductors 306-2 and 306-3 and inductors 306-4 and 306-5, respectively. The insertion therein of transmission line 310-1 and 310-2 is straight forward since the impedance between amplifier branches, as seen by transmission lines 310-1 and 310-2, are always matched to the characteristic impedance of transmission line 440. Those skilled in the art will readily appreciate based on the teachings above that transmission lines 310-3 and 310-4 each has a characteristic impedance matched to termination resistor 307. Furthermore, transmission lines 310-3 and 310-4 are inserted between inductors 306-8 and 306-9, and inductors 306-10 and 306-11, respectively.

Figure 4:
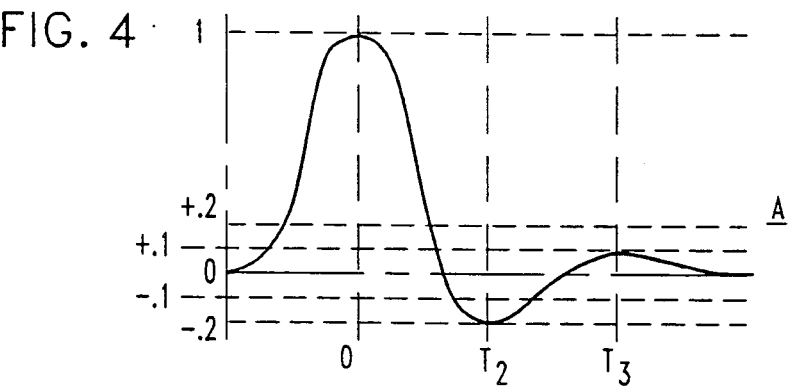
FIGS. 4-8 illustrate the voltage versus time profiles of typical input and output electrical signals for the transversal equalizer shown in FIG. 3.
Figure 5:
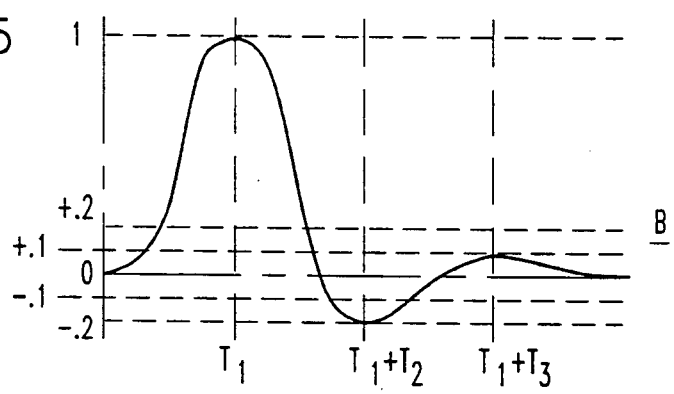
Figure 6:
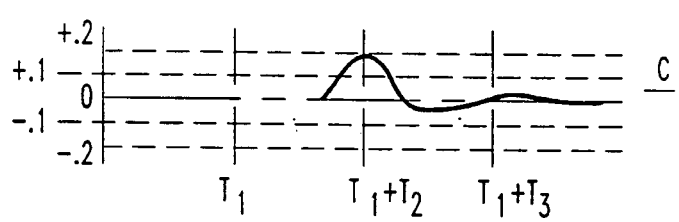
Figure 7:
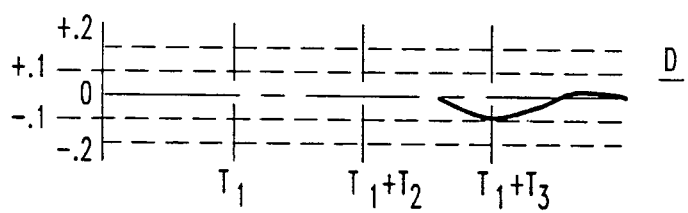
Figure 8:
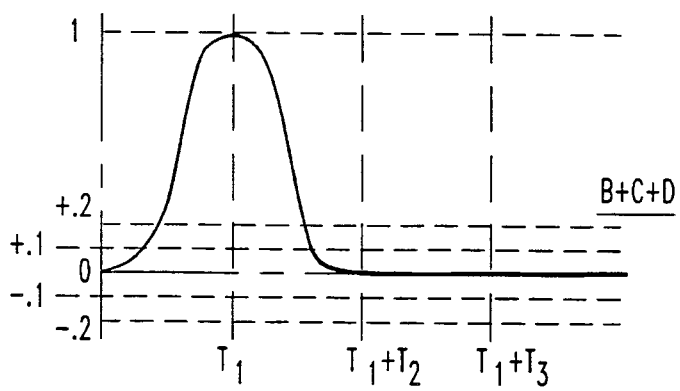

Referring to FIG. 4, assume that electrical signal 340, which is referred by the literal designation A, fed into input port 302 is a pulse with a peak voltage of one volt and, moreover, has two echos with peak voltages of negative two tenths and one tenth volts, respectively. The echoes may be due, for example, from the distortion of the previous circuit, such as amplifiers, cables, mismatched impedance elements and the like. The echoes occur at times $T_2$ and $T_3$ after the occurrence of the main pulse. The time delays in respective amplification paths 330-2 and 330-3, relative to amplification branch 330-1, may be adjusted to have time delays $T_2$ and $T_3$. Consequently, signal 340 travels through amplification branch 330-1 and appears at output port 303, here designated by B, with a delay $T_1$, as shown in FIG. 5. Additionally, signal 340 also travels through amplification branches 330-2 and 330-3 and appears at output port 303, as illustrated in FIG. 6 and 7, at respective times $T_1+T_2$ and $T_1+T_3$, designated by C and D, respectively. The delays associated with amplification branches 330-2 and 330-3 have been adjusted such that the peaks of delayed signals C and D appear at temporal positions corresponding to the positions of the first and second echos. Upon combining the signals from all three branches, which is designated by B+C+D in FIG. 8, the echoes can be effectively canceled, as shown. Of course, the individual gains in the amplifiers of branches 330-2 and 330-3, relative to the gain of the first amplification path 330-1, or main branch, are chosen such that the first and second echos are cancelled in amplitude by delayed signals from delayed branches 330-2 and 330-3. For instance, amplification branches 330-1, 330-2 and 330-3 may have respective gains of +1, +0.2, and −0.1. In other words, by adjusting the delay and amplification within each amplification branch, transversal equalizer 300 can counteract and correct for distortion within signal 340 fed into input port 302.

It is important to note that transversal equalizer 300 exhibits no loss since at each input or output branch because no resistive power splitters or combiners are required. Additionally, transversal equalizer 300 is much smaller than the conventional transversal equalizer since no high gain amplifiers are required to compensate for the attenuation of resistive splitters and combiners generally used in prior art equalizers. In contrast to prior art transversal equalizers, transversal equalizer 300 can easily be assembled as a hybrid integrated circuit. Those skilled in the art will appreciate that transversal equalizer 300 is fully cascadable if termination resistors 307 and 308 are removed. As such, equalizer 300 can be designed in a piece-meal fashion into several hybrid integrated circuits and cascaded by using appropriate transmission lines therebetween.

Figure 9:
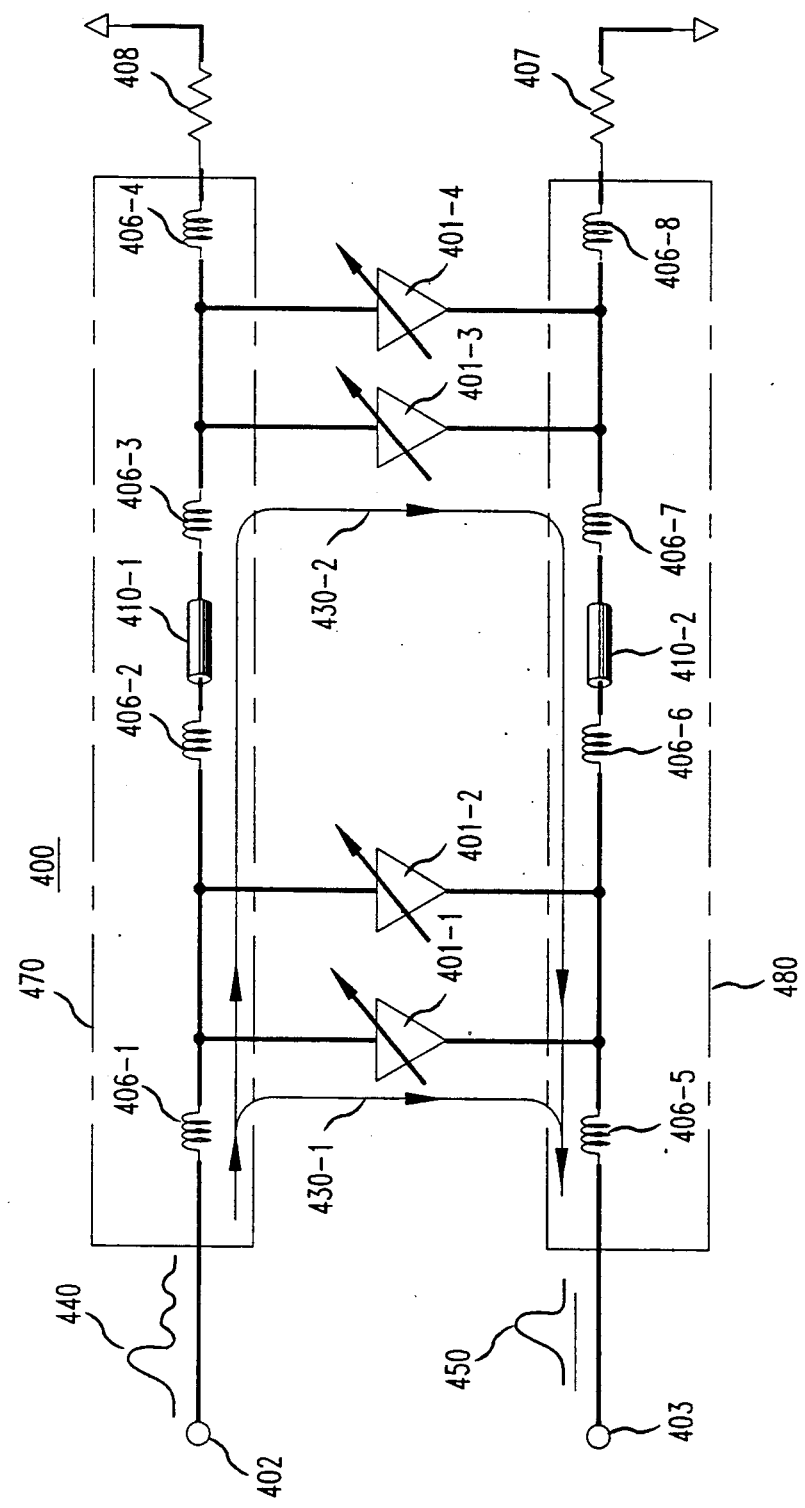

Shown in FIG. 9 is an alternative embodiment for a transversal equalizer which utilizes multiple amplifiers within each amplification branch. With amplification branches 430-1 and 430-2 each having both an inverting and non-inverting amplifier, transversal equalizer 400 can cancel either overshoot or undershoot as discussed abovehere in. In particular, amplifiers 401-1 and 401-2 within amplification branch 430-1, and amplifiers 401-3 and 401-4 within amplification branch 430-2 can either provide positive or negative amplification in order to provide equalization of electrical signal 440 fed to input port 402. In other words, electrical signal 440 may be delayed by transmission lines 410-1 and 410-2 and either appropriately inverted or non-inverted such that upon combining signals from each amplification branch equalized electrical signal 450 appears at output port 403. It should be expressly noted that inductors 406-1 thru 406-8 are chosen in accordance with the input and output capacitances of amplifiers 401-1 thru 401-4 in order to establish "artificial" transmission lines, here 470 and 480. Furthermore, with amplifiers 401-1 thru 401-4 having a voltage controlled gain, transversal equalizer 400 may be utilized for adaptive equalization as discussed in the proceeding sections.

Figure 10:
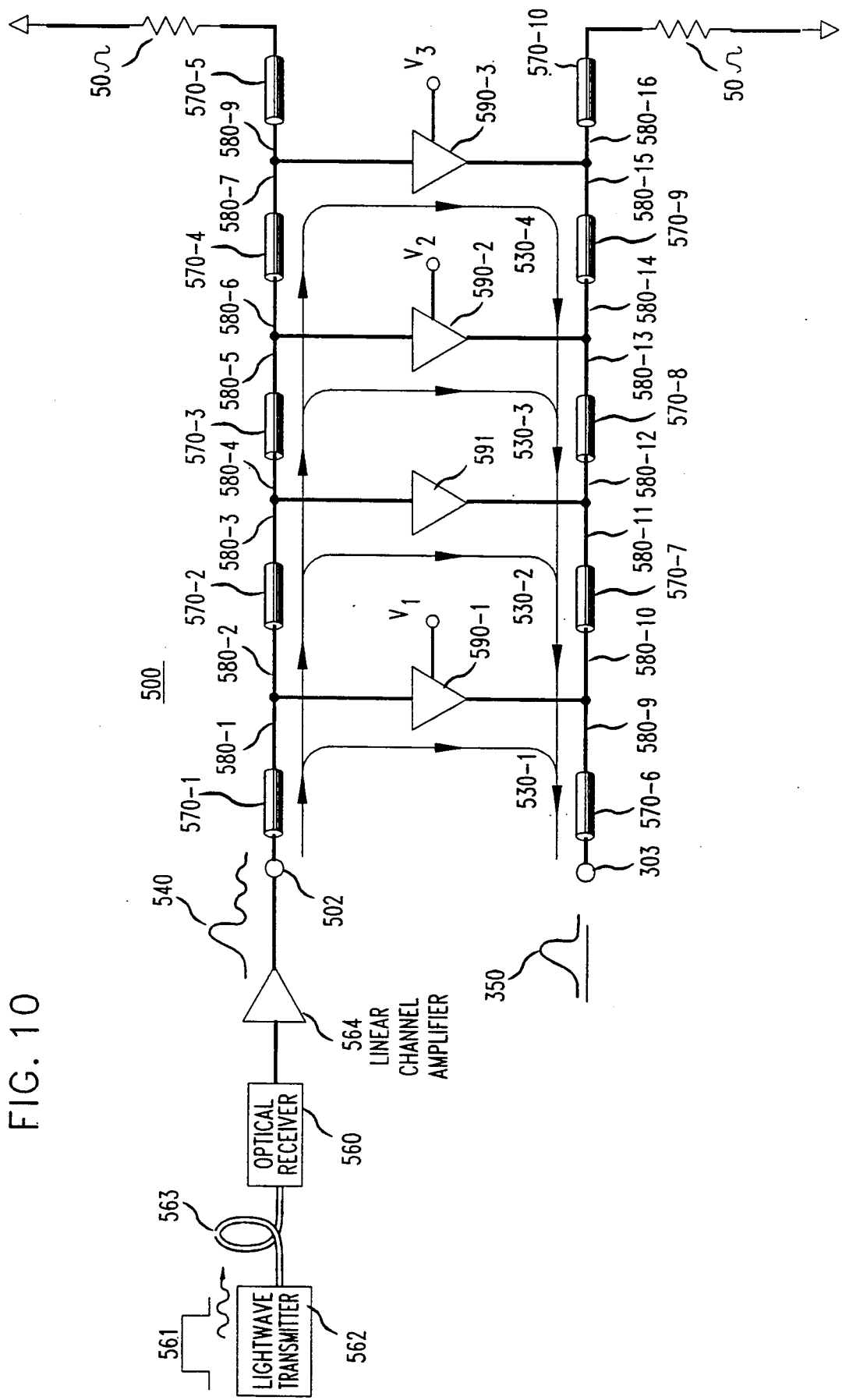

In an example from experimental practice, a four-tap or four-branch transversal equalizer 500 in accordance with the principles of the invention was constructed for equalizing electrical signals of a 7.7 Gb/s receiver 560 and linear channel amplifier 564. Referring to FIG. 10, optical receiver 560 receives and converts into an electrical signal optical signal 561, which is transmitted by lightwave transmitter 562 over fiber 563. In this particular case, it was found that linear channel amplifier 564, which amplifies the converted electrical signal had undershoots at times $-T$, T and 2T with respect to the main pulse received as observed by connecting received electrical signal 540 on an oscilloscope. Herein T is referred to the "time slot" and equivalent to one bit period and, in this particular case, with a bit frequency of 7.7 Gb/s, the "time slot" is approximately equal to 130 ps.

Figure 11:
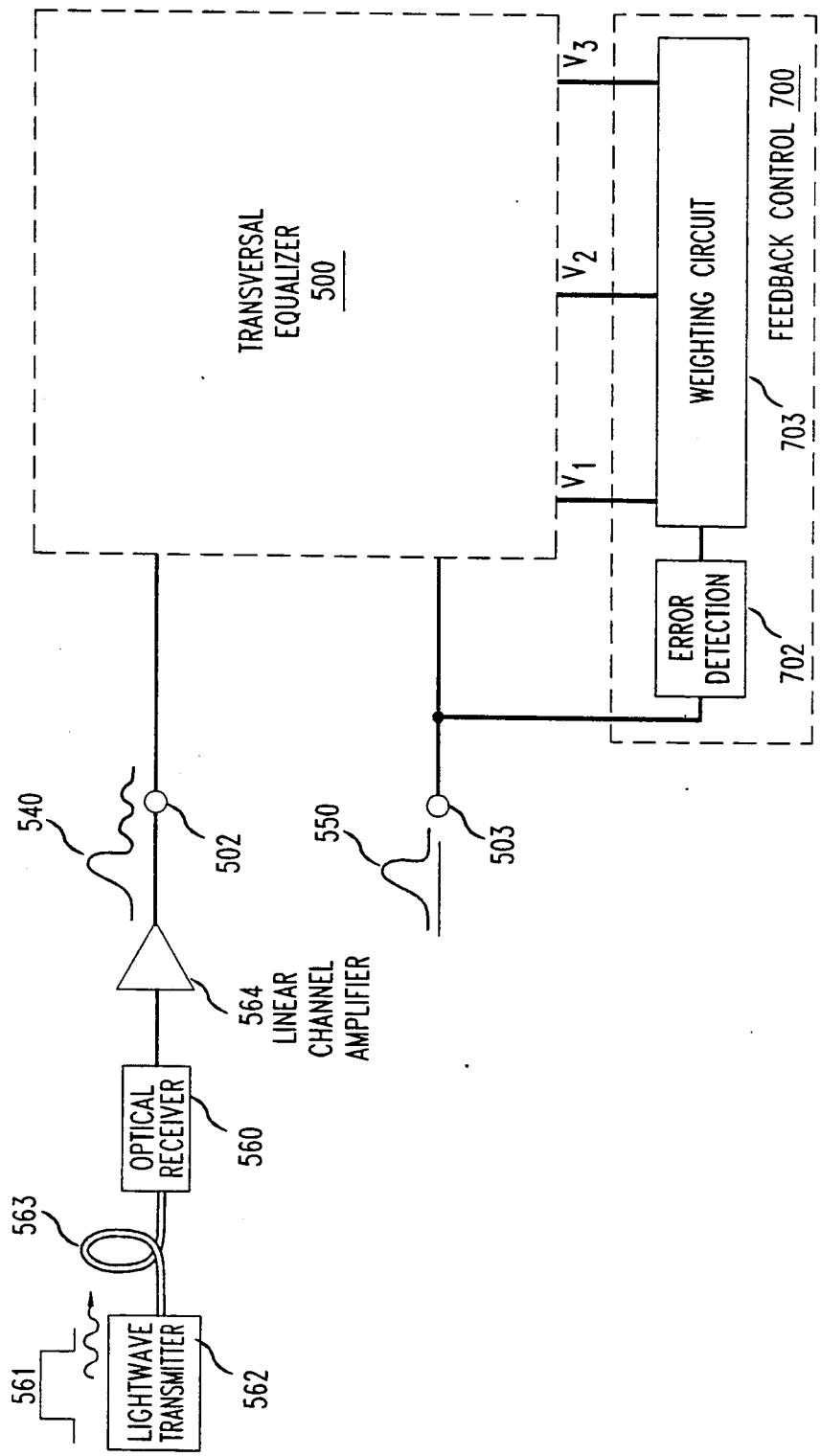
FIG. 11 is a block diagram of an optical communication system utilizing the transversal equalizer shown in FIG. 10 in conjunction with adaptive equalization.

Several design parameters were of specific concern in designing traversal equalizer 500 to compensate for the undershoots in electrical signal 540. Consequently, transversal equalizer 500 was designed with the following parameters: frequency range $\sim$100 kHz-8 Ghz; time slot $\sim$130 ps; ripple on main branch $\sim \pm 1.5$ dB; gain delay branches $\sim -10$ to $-20$ dB relative to the main branch; total gain $\sim$0 dB; input impedance $\sim$50$\Omega$; and output impedance $\sim$50$\Omega$. Furthermore, in designing traversal equalizer 500, the time delays in amplification branches 530-1, 530-2, 530-3, 530-4 were adjusted by inserting appropriate length of transmission lines, here 50$\Omega$ coaxial cables 570-1 to 570-10 between amplification branches 530-1, 530-2 and 530-3 and 530-4, such that each branch had the appropriate time delay. Importantly, transmission lines 570-1 to 570-10 each had a characteristic impedance matched to both the input and output impedances of equalizer 500. The delays are adjusted so that amplified signals of input signal 540 appear at the positions of each echo. In particular, amplification branches 530-1, 530-2, 530-3, and 530-4 had associated time delays of $-T$, 0, T and 2T. It should be noted that in order to achieved a negative delay in branch 530-1 that main branch 530-2 was delayed by one time slot. Additionally, the appropriate inductance in each branch was afforded by utilizing microstrip lines 580-1 to 580-16. The thickness, length and choice of material of the microstrip lines were chosen with consideration to the inductance sought as determined by computer simulation. Two stage designs were utilized for amplifiers 590-1, 590-2 and 590-3 in order to afford non-inverting amplification in branches 530-1, 530-3 and 530-4 as well as single stage design for amplifier 591 for providing inverting amplification in branch 530-2. It should be noted that amplifiers 590-1, 590-2 and 590-3 are voltaged controlled amplifiers, such as dual gate field effect transistors. By characterizing the voltage levels of the undershoots observed in received electrical signal 540 from linear channel amplifier 564, the gains of amplification branches 530-1, 530-3 and 530-4 were adjusted, as discussed above, by appropriately biasing amplifiers 590-1, 590-2 and 590-3. In particular, to control the gain of branches 530-1, 530-3, and 530-4, amplifiers 590-1, 590-2, and 590-3, were biased with bias voltages $v_1$, $v_2$ and $v_3$, respectively, It should be noted that once the signal to be equalized has been characterized and the delays within each branch established by inserting appropriate length of matched transmission lines, the echo positions are time invariant for digital communication systems. In certain cases, however, the amplitudes of the echoes may vary and, thus, it would be advantageous to employ adaptive equalization to compensate for any pulse shape variations in electrical signal 540. Referring to FIG. 11, feedback control 700 is utilized to adaptively change the gain in the amplification branches of equalizer 500 by varying the voltages $v_1$, $v_2$ and $v_3$ in order to compensate for pulse shape variations in electrical signal 540. Specifically, error detecting circuit 702 may be employed to measure the amount of uncompensated error in electrical signal 550 and accordingly via weighting circuit 703 adjusts the gains of amplifiers 590-1, 590-2 and 590-3 so as to minimize the uncompensated error. In effect, the positive feedback adjusts the overall frequency response of equalizer 500 so as to obtain a frequency response characteristic that is appropriate to compensate for the distortion in received electrical signal 540.

Thus, there has been provided, in accordance with the present invention, a traveling wave type transversal equalizer that satisfies the objects, aims and advantages set forth above. While the invention has been described in conjunction with specific embodiments thereof, it is evident that many alternatives, modifications and variations will be apparent to those skilled in the art in light of the foregoing description. Accordingly, all such alternatives, modifications and variations which fall within the spirit and broad scope of the appended claims will be embraced by the principles of the invention.

We claim:

1. A transversal equalizer responsive to an input electrical signal, said input electrical signal including amplitude and phase distortion components, said transversal equalizer comprising:

an input port for receiving said input electrical signal;

an output port for combining first and second amplified electrical signals into an output electrical signal, each of said first and second amplified electrical signals being an amplified replica of said input electrical signal;

first and second amplification branches coupled in parallel between said input and output ports for generating said first and second amplified electrical signals, respectively, said first and second amplification branches including an input artificial transmission line and an output artificial transmission line coupled to said input port and said output port, respectively;

control gain means coupled to said first amplification branch for adjusting the gain thereof in response to a control signal wherein a variation of said gain causes a corresponding change in the frequency response of said transversal equalizer;

delay means coupled to said first amplification branch for delaying said first amplified electrical signal by a delay time feedback control means responsive to the amplitude and phase distortion component in said output electrical signal for generating said control signal to cause the frequency response characteristics of said transversal equalizer to substantially compensate said amplitude and phase distortion components for equalization of said input electrical signal.

2. The transversal equalizer as defined in claim 1 further comprising
   a plurality of first inductors, each of said plurality of first inductors positioned between said first and second amplification branches such that said plurality of first inductors and input capacitances of said first and second amplification branches form said input artificial transmission line.

3. The transversal equalizer as defined in claim 2 further comprising
   a plurality of second inductors, each of said plurality of second inductors positioned between said first and second amplification branches such that said plurality of second inductors and output capacitances of said first and second amplifications branches form said output artificial transmission line.

4. The transversal equalizer as defined in claim 3 wherein said plurality of first and second inductors include microstrip lines.

5. The transversal equalizer as defined in claim 4 further comprising a first termination resistor for said input artificial transmission line.

6. The transversal equalizer as defined in claim 5 wherein said delay means includes
   a first matched transmission line inserted within said input artificial transmission line and between said first and second amplification branches, said first matched transmission line having a characteristic impedance substantially equal to the impedance of said first termination resistor.

7. The transversal equalizer as defined in claim 6 wherein said delay means includes
   a second matched transmission line inserted within said output artificial transmission line and between said first and second amplification branches, said second matched transmission line having a characteristic impedance substantially equal to the impedance of said second termination resistor.

8. The transversal equalizer as defined in claim 7 wherein said first and second matched transmission lines includes a coaxial cable.

9. The transversal equalizer as defined in claims 6 or 7 wherein said first and second amplification branches include a field effect transistor, said field effect transistor having a gate electrode coupled to said input artificial transmission line and a drain electrode coupled to said output artificial transmission line.

10. The transversal equalizer as defined in claims 6 or 7 wherein said first amplification branches includes a dual gate field effect transistor, a first gate electrode of said dual gate field effect transistor coupled to said input artificial transmission line, a drain electrode of said dual gate field effect transistor coupled to said output artificial transmission line, and a second gate of said dual gate field effect transistor coupled to said control signal.

11. The transversal equalizer as defined in claim 5 further comprising a second termination resistor for said output artificial transmission line.

12. A lightwave communication system comprising a lightwave transmitter, a lightwave receiver, a linear channel amplifier, a transversal equalizer and a transmission medium optically coupled jointly to said lightwave transmitter and said lightwave receiver for supporting a lightwave signal therebetween, said lightwave receiver responsive to said lightwave signal for generating an electrical signal, and said linear channel amplifier responsive to said electrical signal for amplifying said electrical signal into an input electrical signal, wherein said input electrical signal includes amplitude and phase distortion components introduced by said linear channel amplifier,
   said transversal equalizer comprising:
      an input port for receiving said input electrical signal;
      an output port for combining first and second amplified electrical signals, each of said first and second electrical signals being an amplified replica of said input electrical signal;
      first and second amplification branches coupled in parallel between said input and output ports for generating said first and second amplified electrical signals, respectively, each of said first and second amplification branches including an input artificial transmission line and an output artificial transmission line coupled to said input port and said output port, respectively,
      said first and second amplification branches having an associated first and second gain, respectively; and
      delay means coupled to said first amplification branch for delaying said first amplified electrical signal by a delay time,
      said first and second gain related to said delay time such that the frequency response characteristics of said transversal equalizer substantially compensate said amplitude and phase distortion components for equalization of said input electrical signal.

* * * * *